(12) United States Patent
Lindgren

(10) Patent No.: US 11,691,348 B2
(45) Date of Patent: Jul. 4, 2023

(54) METHOD FOR MANUFACTURING A HEARING DEVICE

(71) Applicant: GN AUDIO A/S, Ballerup (DK)

(72) Inventor: Erik Lindgren, Ballerup (DK)

(73) Assignee: GN AUDIO A/S, Ballerup (DK)

( * ) Notice: Subject to any disclaimer, the term of this patent is extended or adjusted under 35 U.S.C. 154(b) by 244 days.

(21) Appl. No.: 16/913,552

(22) Filed: Jun. 26, 2020

(65) Prior Publication Data

US 2021/0008810 A1 Jan. 14, 2021

(30) Foreign Application Priority Data

Jul. 9, 2019 (EP) ..................... 19185230

(51) Int. Cl.
| | |
|---|---|
| *B29C 65/16* | (2006.01) |
| *B29C 44/18* | (2006.01) |
| *B29C 44/34* | (2006.01) |
| *B29C 65/48* | (2006.01) |
| *H04R 1/08* | (2006.01) |

(Continued)

(52) U.S. Cl.
CPC ........ *B29C 65/1635* (2013.01); *B29C 44/188* (2013.01); *B29C 44/3419* (2013.01); *B29C 44/3492* (2013.01); *B29C 65/4815* (2013.01); *H04R 1/08* (2013.01); *H04R 1/1075* (2013.01); *H04R 25/604* (2013.01); *B29K 2101/12* (2013.01); *B29K 2995/0026* (2013.01);

(Continued)

(58) Field of Classification Search
CPC .... B29C 65/1635; H04R 25/658; H04R 31/00
See application file for complete search history.

(56) References Cited

U.S. PATENT DOCUMENTS

| | | | | |
|---|---|---|---|---|
| 6,097,826 A | * | 8/2000 | Clavadetscher ..... | H04R 25/659 |
| | | | | 381/328 |
| 6,741,718 B1 | * | 5/2004 | Brumitt ................ | H04R 1/1016 |
| | | | | 379/430 |

(Continued)

FOREIGN PATENT DOCUMENTS

| | | |
|---|---|---|
| CN | 206728248 U | 12/2017 |
| JP | 6046329 B2 * | 12/2016 ......... B29C 65/1635 |
| WO | WO-2006070066 A1 * | 7/2006 ......... B29C 65/1635 |

OTHER PUBLICATIONS

JP-6046329-B2 machine translation (Year: 2016).*

(Continued)

*Primary Examiner* — Michael W Hotchkiss
(74) *Attorney, Agent, or Firm* — Hamre, Schumann, Mueller & Larson, P.C.

(57) ABSTRACT

A method for manufacturing a hearing device is disclosed. The hearing device comprises a speaker, a first chamber, and a sound channel arranged between the first chamber and the surroundings of the hearing device or a second chamber. An element of a thermoplastic material being in a solid state is arranged in the sound channel. A laser light is applied to the element to thereby activate the element to change from the solid state to a liquid state. The element then changes from the solid state to the liquid state filling out a cross-section of the sound channel and thereby sealing the sound channel. Finally, cooling of the element is allowed leading to a change of the element from the liquid state to solid state while filling out the cross-section of the sound channel.

13 Claims, 7 Drawing Sheets

(51) Int. Cl.
  *H04R 1/10* (2006.01)
  *H04R 25/00* (2006.01)
  *B29K 101/12* (2006.01)
  *B29L 31/34* (2006.01)
(52) U.S. Cl.
  CPC ....... *B29L 2031/3418* (2013.01); *H04R 25/65* (2013.01); *H04R 25/658* (2013.01)

(56) References Cited

U.S. PATENT DOCUMENTS

| | | | | |
|---|---|---|---|---|
| 6,751,327 | B1* | 6/2004 | Urso | H04R 25/602 381/328 |
| 8,311,255 | B2 | 11/2012 | Hankey et al. | |
| 9,247,335 | B2* | 1/2016 | Taylor | H02G 3/22 |
| 2004/0081328 | A1* | 4/2004 | Leedom | H04R 25/602 381/323 |
| 2004/0112519 | A1* | 6/2004 | Mori | B29C 66/836 428/57 |
| 2004/0237422 | A1* | 12/2004 | Tat | B29C 65/1435 52/745.08 |
| 2008/0123866 | A1* | 5/2008 | Rule | H04R 25/405 381/71.6 |
| 2008/0132292 | A1* | 6/2008 | Hansen | H04R 1/326 455/569.1 |
| 2008/0205679 | A1* | 8/2008 | Darbut | H04R 25/554 381/328 |
| 2010/0061583 | A1* | 3/2010 | Taenzer | H04R 25/00 381/380 |
| 2010/0206860 | A1* | 8/2010 | Chua | B33Y 10/00 219/121.85 |
| 2011/0188689 | A1* | 8/2011 | Beck | H04R 25/609 381/328 |
| 2012/0224710 | A1* | 9/2012 | Terlizzi | H04R 5/033 381/74 |
| 2013/0028460 | A1* | 1/2013 | Lee | B29C 66/836 381/370 |
| 2014/0068944 | A1* | 3/2014 | Aase | H04R 31/006 29/721 |
| 2015/0078597 | A1* | 3/2015 | Andrea | H04R 5/033 381/309 |
| 2015/0110320 | A1* | 4/2015 | Liu | H04R 1/44 381/322 |
| 2016/0165335 | A1 | 6/2016 | Goossens | |
| 2016/0198254 | A1* | 7/2016 | Gecawicz | H04R 1/1008 381/375 |
| 2017/0094395 | A1* | 3/2017 | McPeak | H04R 1/1016 |

OTHER PUBLICATIONS

The Extended European Search Report issued in European Application No. 19185230.0, dated Dec. 13, 2019, 9 pages provided.
"Controlling Heat Curing Adhesive Processes Using Infrared Spot Curing", Manufacturing & Prototyping, Jan. 1, 2012, 3 pages provided.
Lilly et al., "An Overview Of Adhesives Used In Electronic Manufacturing", Electronic Manufacturing, Jul. 1988, 3 pages provided.

* cited by examiner

Fig. 5a
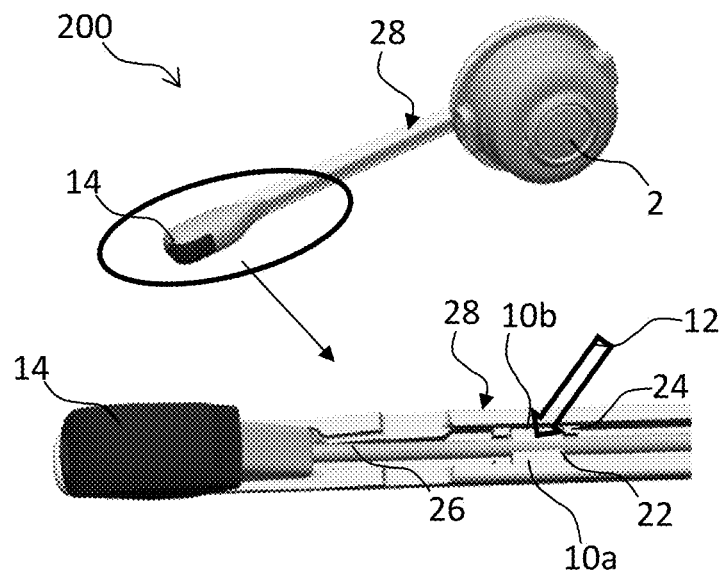
Fig. 5b
Fig. 5c
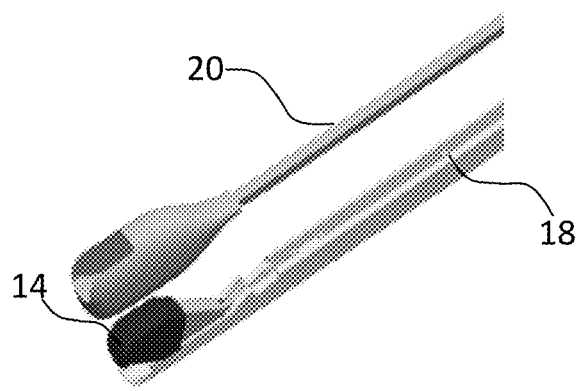

METHOD FOR MANUFACTURING A HEARING DEVICE

TECHNICAL FIELD

The present disclosure relates to a method for manufacturing a hearing device by use of a laser light.

BACKGROUND ART

Hearing devices are used in a wide variety of everyday life activities. The hearing devices include one or more speakers enclosed in speaker chambers. Sound channels are typically arranged between, e.g., surroundings and the speaker chamber. These sound channels may provide an acoustic path which is undesired and in order to provide the hearing device with the best properties, the undesired sound path needs to be acoustically sealed or blocked. Further, in hearing devices comprising a microphone and the speaker, there is a requirement to block the acoustic path between the microphone and the speaker as sound from the speaker may get amplified by the microphone which creates howling in the hearing device. Blocking unwanted sound channels in the hearing devices is a requirement in many hearing device designs.

Expanding closed-cell-foams have been previously used to block a sound path in hearing devices. Foam is difficult to control and thereby not convenient for use in the manufacturing process. Silicone glue is also used in many products existing on the market. However, glue is difficult to handle especially because of the texture of glue, such as the viscosity of glue changing rapidly if glue is stationary during the sealing of the sound channel what may cause excessive amounts of wasted glue during device manufacturing. Glue is sensitive to changes in temperature and humidity and therefore may create additional storage requirements of the hearing devices in order to let the glue cure and/or remain in a certain condition. Furthermore, glue is expensive. Further, double adhesive tapes may be used to block sound path, however only for small gaps openings.

Therefore, there is a need to for an improved method to solve problems of the prior art.

SUMMARY OF THE INVENTION

It is an object of embodiments of the present invention to provide a method for manufacturing a hearing device in which an unwanted sound channel is sealed in a controlled manner.

It is a further object of the embodiments of the present invention to provide a simple and inexpensive method for manufacturing a hearing device.

It is a yet further object of embodiments of the present invention to provide a method for manufacturing a hearing device in which an unwanted sound channel is sealed from outside of the device having the hearing device already assembled.

It is a yet further object of embodiments of the present invention to provide a method for sealing a sound channel of a hearing device of any size.

In the first aspect, the invention provides a method for manufacturing a hearing device, the hearing device comprising a speaker, a first chamber, and a sound channel arranged between the first chamber and the surroundings of the hearing device or a second chamber, the method comprising:

arranging an element of a thermoplastic material in the sound channel, the element being in a solid state;

applying a laser light to the element to thereby activate the element to change from the solid state to a liquid state;

sealing the sound channel by means of the element changing from the solid state to the liquid state thereby filling out a cross-section of the sound channel;

allowing cooling of the element thereby a change of the element from the liquid state to solid state while filling out the cross-section of the sound channel.

Thus, the invention provides a method for manufacturing a hearing device comprising a sound channel and wherein the sound channel is sealed by a thermoplastic element being in a solid state. The element is heated by a laser light and thereby transformed into a liquid state in a controlled manner.

The hearing device may be a cabinet speaker or any other type of loudspeaker, receiver or speaker, a headset, a hearing aid, or the like.

The hearing device comprises a speaker which is configured for converting an electrical audio signal into a corresponding sound. The hearing device may comprise more than one speaker. The speakers may be placed in different separate compartments inside the hearing device. The speaker(s) of the hearing device may comprise a membrane which vibrates during sound generation. Due to membrane vibrations there is a pressure difference between a front and rear side of the membrane. This pressure difference and the membrane causes sound generation.

A first chamber is to be understood as a space which allows for sound generation. It may be a space in front of the speaker or it may be a space behind the speaker. Alternatively, it may be a space above the speaker or it may be a space below the speaker. The first chamber may be a space where the speaker is secured, attached or fixed.

A sound channel is arranged between the first chamber and the surroundings of the hearing device or between the first chamber and a second chamber. In most of designs of the hearing devices, an acoustic path in the sound channel is undesired. There is a requirement in many hearing devices designs to acoustically seal the sound channel and prevent instabilities and undesired sound oscillations due to acoustic feedback in the hearing devices. The second chamber may be a space in front of the speaker or it may be a space behind the speaker. Alternatively, it may be a space above the speaker or it may be a space below the speaker. The second chamber defines a space different from the first chamber.

According to the invention, an element of a thermoplastic material is arranged in the sound channel. The element is in a solid state and may be in a form of a rectangular block, a sphere, a circular or oval ring, or similar. The shape of the element may be determined by the cross-section of the sound channel. The element in the solid state is to be activated/melted by heat to thereby seal the sound channel.

A laser light is applied to the element to thereby activate the element to change from the solid state to a liquid state. The laser light may be characterized by its wavelength, power, energy, intensity, and similar. The wavelength of the laser light may be chosen such that it provides interaction with the thermoplastic material of the element and thereby activation of the element and transformation of its state from solid to liquid. The laser light may be applied to the element for a very short time, such as for 1 second or shorter. The duration of the laser light application may depend on the size of the element, the volume of the sound channel and/or its cross-section, and/or it may depend on various properties of the thermoplastic material. When the laser light is applied to the element it provides energy to the element and thereby heat. The thermoplastic material typically softens when heated and hardens when cooled. Therefore, by applying the laser light having a suitable wavelength to the element, the element softens taking an intermediate state between solid and liquid, and then transforms into liquid which seals the sound channel. The thermoplastic material can be heated and cooled several times without any change in its chemical or mechanical properties. It means that the laser light can be applied to the element several times until a required sealing is achieved. Namely, the step of applying the laser light to the element may be started and restarted many times without any risk of wasting the material, or a need to replace the element after a restart of the laser application. This reduces overall cost of the manufacturing process.

The sound channel is sealed as the element changes its state from the solid state to the liquid state. During this change in the state, the element fills out a cross-section of the sound channel. When the cross-section of the sound channel is filled with the element there may not be any air flow between the first chamber and the surroundings or between the first chamber and the second chamber. The element may fill out only a part of the entire volume of the sound channel, such as 10% of the volume or less.

In the last step of the method, the element cools and thereby changes its state from the liquid state back to the solid state while filling out the cross-section of the sound channel. Cooling of the element may start as soon as the laser light is no longer applied to the element. Depending on the properties of the thermoplastic material used for the element, the cooling step may be as rapid as the step of heating, i.e. duration of the laser light application.

Sealing of the sound channel performed by the laser light interacting with the thermoplastic material is a controlled process in which by controlling the laser light properties, such as intensity, wavelength, energy, duration of application, etc., the thermoplastic element is precisely moulded. Additionally, initial amount of the thermoplastic material used can be accurately controlled as it is in the solid state before the laser light is applied. Therefore, an overflow of the thermoplastic material when it is transformed into the liquid state cannot occur as the amount of thermoplastic material is precisely determined prior to application of the laser light and its flow when in the liquid state can also be controlled by the laser light. The thermoplastic material can provide sealing of sound channels of any size, ranging from sound channels in large cabinet speakers to sound channels in hearing aids. Even if the thermoplastic material forms a seal which is not in line with a targeted shape, the process can be repeated until a desired seal is achieved. Furthermore, by controlling the laser light, state change is accurately controlled and handling of liquid is improved to a great extent.

The hearing device may further comprise a microphone, wherein the speaker may be arranged in the first chamber and the microphone may be arranged in the second chamber. The microphone converts sound into an electrical signal. When the hearing device comprises both the microphone and the speaker, the sound channel is typically provided between these two and in particular due to wiring. In such scenario, an acoustic feedback path is created in the sound channel. Namely, a portion of the sound coming from the speaker may travel through the sound channel, be picked up by the microphone, then amplified by the speaker, and radiated back into the surroundings of the hearing device. Furthermore, the amplified portion of the sound may be radiated back into the microphone, and so forth. This repeating cycle of sound amplification is undesired as it can create instability in the hearing device functioning, generate buzzing and howling. In order to prevent these undesired effects, the sound path between the speaker and the microphone may need to be closed.

The hearing device may further comprise a speaker housing, the first chamber and the second chamber being arranged in the speaker housing. In this embodiment, the speaker may be a separation between the first and second chamber and the speaker housing may represent an enclosure of the hearing device. The speaker may be arranged on a printed circuit board carrying various electronics comprised in the hearing device. The printed circuit board may then define a border between the first and second chamber. The sealing to be created between the first and the second channel may also serve as a sealing between the surroundings of the hearing device and the interior of the speaker housing.

If the hearing device is a cabinet speaker, the speaker housing encloses together with the speaker the first chamber, typically called a rear chamber. If the hearing device is a closed headset/headphone, the speaker housing, the speaker, an ear cushion, and the user's head encloses the first, i.e. front, chamber and the second, i.e. rear, chamber. The front chamber is arranged between the front of the speaker and the user's ear. Thus, the speaker membrane acts as a dividing wall between the rear chamber and the front chamber. If the hearing device is an open headphone, there is no closed front chamber. In this embodiment, it is desired to prevent uncontrolled leakage between the rear chamber and the front chamber. Therefore, undesired sound paths occurring due to unavoidable part tolerances should be minimised.

The hearing device may comprise a bottom part and a top part and the element may be provided in a compartment defined by at least a portion of the bottom part and by at least a portion of the top part, and wherein the compartment is further defined by at least one protrusion extending into the interior of the sound channel of hearing device. The top part and the bottom part may be made of any material. They may be made of a plastic material. The plastic material which may be used for the top and bottom part of the hearing device may have properties which significantly differ from the properties of the thermoplastic material used for the element, especially in properties related to a melting temperature as at least a portion of the top and/or bottom part may be exposed to the laser light during hearing aid manufacturing. The manufacturing method may further comprise steps of:

providing the bottom part and the top part prior to the step of arranging the element; and assembling the hearing device by connecting the bottom part and the top part after the step of arranging the element.

In this way, the method provides a hearing device in which the sound channel is sealed from outside of the device having the hearing device already assembled.

The compartment in which the element may be provided may be defined by protrusions extending towards the sound channel and being formed in the bottom and/or the top part of the hearing device. Preferably, there are four protrusions arranged such that they form a space in the canal of the bottom part of the hearing device. The formed space may have spherical shape, rectangular shape, etc., depending on the shape of the top and bottom part of the hearing device. The compartment can be understood as structural borders created to control reshaping and flow of the element when the element is in the liquid state. The size/volume of the compartment may be slightly smaller than the size/volume of the element, such as less than 10% smaller. Larger size/volume of the element compared to the compartment may be needed as excess amount of the element may leak out of the compartment thereby providing a tight seal without any air gaps.

The top part may be made of a material transparent to the laser light and wherein the bottom part may be made of a material non-transparent to the laser light. In this embodiment, the laser light may be directed at the top part. Alternatively, the top part may be made of a material non-transparent to the laser light and the bottom part may be made of a material transparent to the laser light. In this embodiment, the laser light may be directed to the transparent bottom part. The material transparent to the laser light may not interact with the laser light and may not be influenced by the laser light. Namely, the material transparent to the laser light allows the transport of light without or with a minor light-matter interaction. The material which is non-transparent to the laser light is to be understood as a material which can absorb majority of the laser light applied to it. Transparency and non-transparency of the material depend on a laser wavelength. Therefore, the wavelength of the laser light to be used may depend on the materials used for the hearing device, and in particular the material of the element. By choosing the top and/or bottom part to be made of a material transparent to the laser light it is possible to direct the laser light towards the top and/or bottom part and thereby perform sealing of the sound channel from the outside the hearing device and having the hearing device already assembled.

In an alternative embodiment, both the top part and the bottom part may be made of a material transparent to the laser light. By having both the top and bottom part of the hearing device made of the material transparent to the laser light, sealing can be performed by applying the laser light from any direction, i.e. both from the top and/or bottom part of the hearing device thereby providing for a flexible arrangement of the laser with respect to the hearing device. Furthermore, if the laser light is applied to only, e.g., top part, the light will interact only with the element as the bottom part is transparent to the laser light.

In one embodiment, the element may be provided closer to the second chamber than to the first chamber. When providing the element closer to the second chamber, i.e. closer to one of the ends of the hearing device mechanical properties of the hearing device are improved. Namely, a boom arm may be provided between the first chamber and the second chamber, i.e. connecting the first and second chamber. When the element is provided at one end of the boom arm, flexibility of the boom arm is also improved. Flexibility of the hearing device is important as the hearing device may be exposed to various forces which may cause breaking of the device.

In an alternative embodiment, the element may be provided closer to the first chamber than to the second chamber. As in the previously described embodiment, mechanical properties, and especially flexibility of the hearing device is improved. In contrast, if the element is arranged around the center of the boom arm, i.e. at around the same distance from both the first and second chamber, the boom arm may be less flexible and therefore more prone to breaking.

In principle, the element may be provided anywhere in the sound channel, and may be of any size. If the hearing device comprises the boom arm, it is preferred that only a small portion of the boom arm is blocked by the element, and not the entire boom arm. If the entire boom arm is filled by the element, the arm may, due to larger stiffness, be more prone to breaking. Positioning of the element and choosing its size may be determined with respect to mechanical requirements, especially shock pressure allowed for the hearing device.

The hearing device may comprise one or more wires interconnecting the speaker and the microphone, and the one or more wires may be arranged in the sound channel and through the element. The one or more wires may be arranged in the boom arm that may need to be sealed. The wires typically interconnect the microphone, i.e. a tip of the microphone, with electronics arranged in the hearing device. The electronics is further interconnected with a battery and other electronics arranged in the housing of the hearing device which are then further interconnected with the speaker. Having the wires arranged in the sound channel and through the element improves sound generated by the hearing device.

In one embodiment, the element may comprise two portions and the one or more wires may be arranged between the two portions. The two portions of the element may be made from the same thermoplastic material or they may be made from two different ones. In this embodiment, the method for manufacturing the hearing device may further comprise:

arranging a first portion of the element in the sound channel, the first portion of the element being in a solid state;

arranging the one or more wires interconnecting the speaker and the microphone, the one or more wires being arranged on top of the first portion of the element;

arranging a second portion of the element in the sound channel and besides or on top of the first element and the one or more wires;

applying the laser light to the element thereby causing a change in state of the element;

sealing the sound channel as the first portion and the second portion of the element transform into the liquid state thereby filling out the cross-section of the sound channel;

allowing cooling of the first portion and the second portion of the element thereby causing a change in state of the element from the liquid state back to the solid state.

When the element changes its state upon the laser light application, the one or more wires may remain fixed around the center of the element while being unaffected by the laser light. By having the element comprising the two portions a more reliable sealing around the wire may be obtained. Regardless of the element comprising two or more portions, only one step of laser application may be required. When the element is melted, it may flow around the wire closing even the smallest air gaps existing in the vicinity of the wire.

In order to avoid interaction between the laser light and the wire, the wire may comprise an insulation material transparent to the laser light. The wire typically has a plastic insulation. When the insulation is transparent to the laser light it would not melt when the laser light is applied to the element. The insulation may be coloured in a number of different colours. The selected colour of the insulation may depend on the wavelength of the laser light. For wavelengths typically used for laser welding suitable colours may be white for ground and red for phase. Use of other colours is also possible, such as use of yellow, blue, orange, green, and similar. Typically, if the insulation is dark it will interact with the laser light and melt what is not desirable. Additionally, the wire may be secured against electrostatic discharge in a tube transparent to the laser light.

The thermoplastic material may be a thermoplastic adhesive. The thermoplastic adhesive is a heat-activated adhesive which may generate joint strength almost instantly after cooling. The thermoplastic adhesive is composed such that it melts at a lower temperature that the melt temperature of the material forming the sound channel, e.g. the top and bottom part of the hearing device. When using the thermoplastic adhesive, the sealing process is fast and liquid waste is reduced to minimum.

The thermoplastic adhesive may be a hot melt adhesive, such as a hot melt glue. The hot melt glue is activated by heat generated by the laser light and provides a desired seal of the sound channel which is easy to disassemble and repair if needed. Further, storage requirements of the hearing device is simpler compared to seals formed by, e.g., expanding foams, silicone glue, standard glue, or double adhesive tapes. Furthermore, the hot melt glue are not limited to sealing only small size sound channels but may seal sound channels of any size, i.e., in hearing devices of any size ranging from cabinet speakers to miniature hearing aids.

The thermoplastic material may have a melting point which is lower than a melting point of the top part and a melting point of the bottom part, the melting point of the thermoplastic material may be in the range between 85° C. and 100° C. Melting points of the top part and the bottom part may be in the range between 230° C. and 290° C. A relatively low melting temperature of the element allows for softening and melting of the element while other parts which are also exposed to the laser light are not influenced by heat produced by the laser.

The laser light may be a continuous wave laser light, and the wavelength of the laser light may be about 985 nm. The wavelength of the laser may be tuned in a range from 950 nm up to 1050 nm depending on the exact chemical properties of the element used in the hearing device. As mentioned above, the laser light is chosen to fit the thermoplastic material of the element, as well as the material used for other parts of the hearing device which may be exposed to the laser light during the sealing process. The continuous wave laser light provides a concentrated heat source, allowing for narrow and precise welds which are desired in a hearing device industry, especially in hearing aids which are becoming smaller and smaller every year. Further, the laser light may have high power density resulting in small heat-affected zones and high heating rates. When using the laser with high power density, the sealing of the sound channel can be achieved in several seconds including both application of the laser light melting the element and cooling of the element when the element is transformed back into the solid state. Power density of the laser may be in the order of 0.1 MW/cm$^2$ up to 2 MW/cm$^2$. It can be varied/controlled depending on the size of the sound channel and various properties of the element.

The laser light may be applied by guiding the light towards the element by means of at least one mirror arranged on a fixture, the mirror reflecting the laser light. The laser light/mirror(s) can be moved relative to the hearing device, and/or the hearing device to be manufactured can be moved relative the laser light/mirrors. Preferably, two mirrors are used and the laser and the hearing device are steady while the mirrors or the fixture are moving in order to direct the laser beam onto the entire surface of the element. The mirrors may also be arranged such that the laser light falls onto the element. In one arrangement, the laser may be moving while the mirror(s) and the hearing device are steady. Having the mirrors arranged on the fixture allows for a large flexibility of the manufacturing process. Alternatively, the laser itself may comprise additional movable mirrors in its galvo-head which may then direct the laser light towards the element.

In the second aspect, the invention provides a hearing device being manufactured by a method according to the first aspect presented above.

In the third aspect, the invention provides a hearing device comprising:
  a first chamber;
  a second chamber;
  a speaker;
  a sound channel arranged between the first chamber and the surroundings of the hearing device or the second chamber;
  an element of a thermoplastic material, the element configured to be activated by a laser light and to change from a solid state to a liquid state during manufacturing, the element being configured to seal the sound channel by means of the element changing from the solid state to the liquid state.

A skilled person would readily understand that any feature described in combination with the first aspect of the invention could also be combined with the second and third aspects of the invention, and vice versa. Accordingly, the remarks set forth above with reference to the first aspect of the invention are equally applicable to the second and third aspect.

The present invention relates to different aspects including the method described above and in the following, and corresponding hearing devices, methods, devices, systems, networks, kits, uses, processes, products-by-process, and/or product means, each yielding one or more of the benefits and advantages described in connection with the first mentioned aspect, and each having one or more embodiments corresponding to the embodiments described in connection with the first mentioned aspect and/or disclosed in the appended claims.

BRIEF DESCRIPTION OF THE DRAWINGS

The above and other features and advantages will become readily apparent to those skilled in the art by the following detailed description of exemplary embodiments thereof with reference to the attached drawings, in which:

FIGS. 5(a-c) illustrate a detailed view of the hearing device shown in FIG. 4.

DETAILED DESCRIPTION

Figure 1:
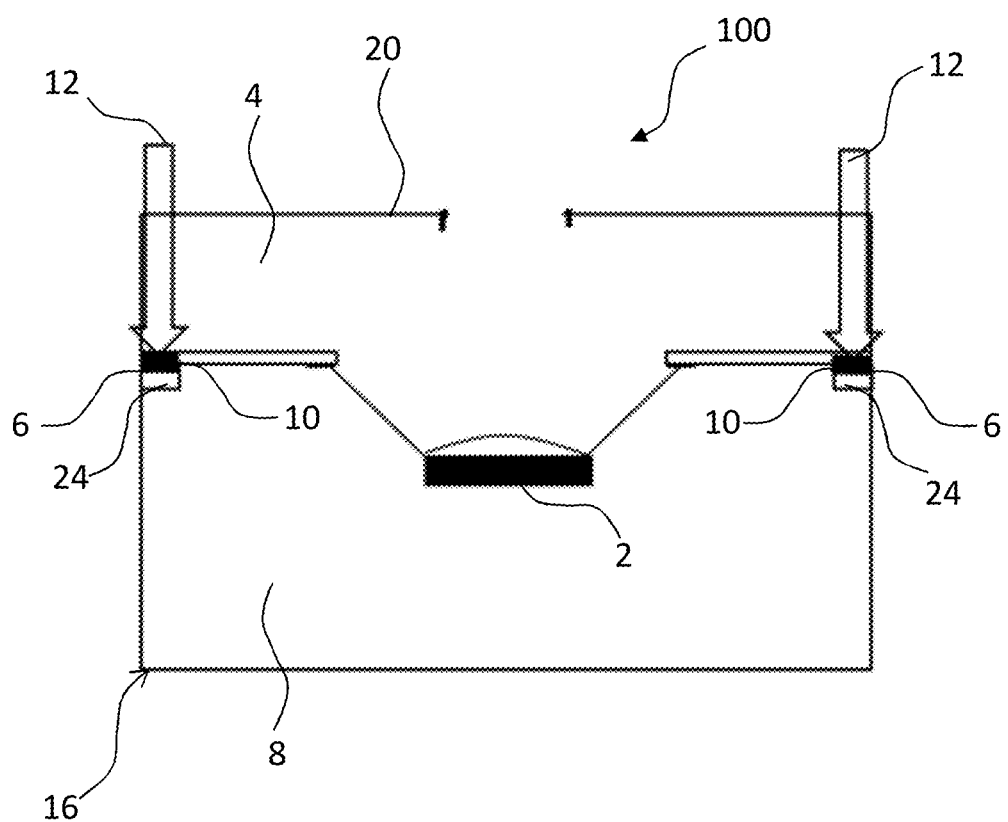
FIG. 1 schematically illustrates a first embodiment of a hearing device.

Various embodiments are described hereinafter with reference to the figures. Like reference numerals refer to like elements throughout. Like elements will, thus, not be described in detail with respect to the description of each figure. It should also be noted that the figures are only intended to facilitate the description of the embodiments. They are not intended as an exhaustive description of the claimed invention or as a limitation on the scope of the claimed invention. In addition, an illustrated embodiment needs not have all the aspects or advantages shown. An aspect or an advantage described in conjunction with a particular embodiment is not necessarily limited to that embodiment and can be practiced in any other embodiments even if not so illustrated, or if not so explicitly described.

Throughout, the same reference numerals are used for identical or corresponding parts.

FIG. 1 schematically illustrates a first embodiment of a hearing device 100. A cross-section of the hearing device 100 is illustrated. The hearing device 100 comprises a speaker 2, a first chamber 4, and a sound channel 6 arranged between the first chamber 4 and the second chamber 8. The sound channel 6 is also arranged between the first chamber 4 and a second chamber 8 and the surroundings of the hearing device 100 or the second chamber 8. The hearing device 100 comprises a speaker housing 16 enclosing the speaker 2 and other parts of the hearing device 100. An element 10 of a thermoplastic material and being in a solid state is arranged in the sound channel 6. A laser light 12 is applied to the element 10 to thereby activate the element 10 to change from the solid state to a liquid state. The sound channel 6 is sealed by means of the element 10 changing from the solid state to the liquid state thereby filling out a cross-section of the sound channel 6. Once the laser light 12 is switched off, the element 10 cools and thereby change from the liquid state to solid state while filling out the cross-section of the sound channel 6.

In FIG. 1, two laser beams 12 are arranged to activate the element and thereby seal the sound channel 6. Alternatively, only one laser beam 12 may be applied and then moved along the element 10. Alternatively, mirrors can be used to direct the laser light 12 onto the element 10. Further, the laser light 12 is applied through a top part 20 of the hearing device 100. In this scenario, the top part 20 is made of a material which is transparent to the laser light 12. Alternatively, the laser light 12 may be applied through a bottom part 18 which is then made of a material transparent to the laser light 12. Protrusions 24 are arranged in the sound channel 6 to define how the element 10 will melt under the laser light 12 and thereby seal the sound channel 6.

Figure 2A:
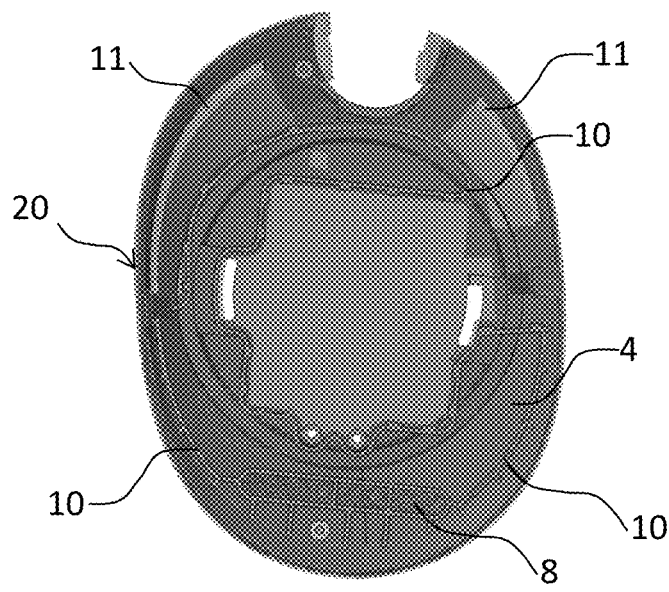
FIGS. 2(a-c) illustrate a detailed view of the embodiment of the hearing device shown in FIG. 1.
Figure 2B:
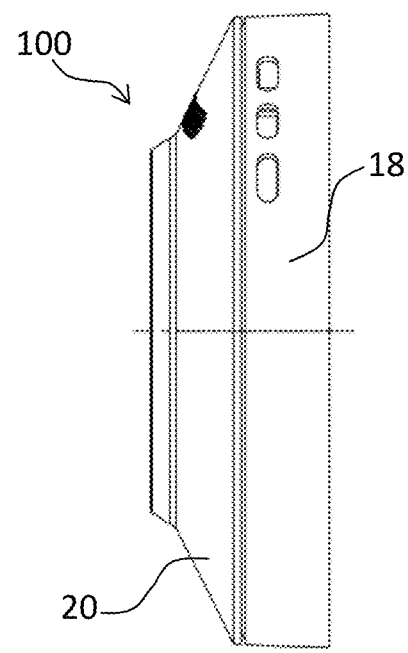
Figure 2C:
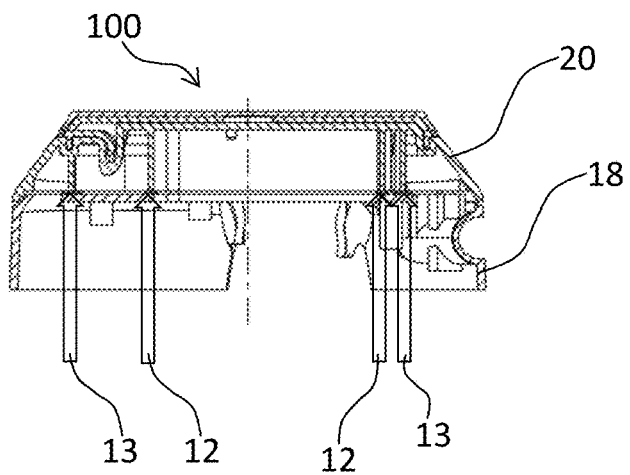

FIGS. 2(a-c) illustrate a detailed view of the embodiment of the hearing device 200 shown in FIG. 1. FIG. 2(a) shows a top view of the top part 20 defining the first (speaker) chamber 4 and the second (microphone) chamber 8 and the element 10 arranged in such a manner to provide the sealing between the microphone chamber 8 and the speaker chamber 4. The element 10 may have a width of 0.8 mm. A welding area 11 for ensuring a mechanical bond between the top part 20 and the bottom part is also arranged in the top part 20. FIG. 2(b) illustrates the assembled hearing device 100 assembled by connecting the top part 20 and the bottom part 18. FIG. 2(c) illustrates the assembled device 100 onto which the laser light 12 is applied onto the element in order to seal the microphone chamber from the speaker chamber. In this embodiment, the laser light 12 is applied at two different places targeting the element at two different positions. More laser beams 12 may also be applied. The laser light 12 and the welding beams 13 are applied through the bottom part 18. Welding beams 13 are applied onto the welding area in order to ensure mechanical bonding between the bottom part 18 and the top part 20. The welding area 11 may be non-transparent to the welding beam 13. The non-transparent welding area 11 will then be heated and melted by the laser welding beam 13. Also, a corresponding area of the bottom part 18 may be non-transparent to the welding beam 13 and will therefore melt under the welding beam.

The two parts 18 and 20 will then be welded to each other. If both the bottom part 18 and the top part 20 are transparent to the welding beam 13, one of the surfaces may be painted dark, whereby heat will build up and melt the two surfaces together.

Figure 3A:
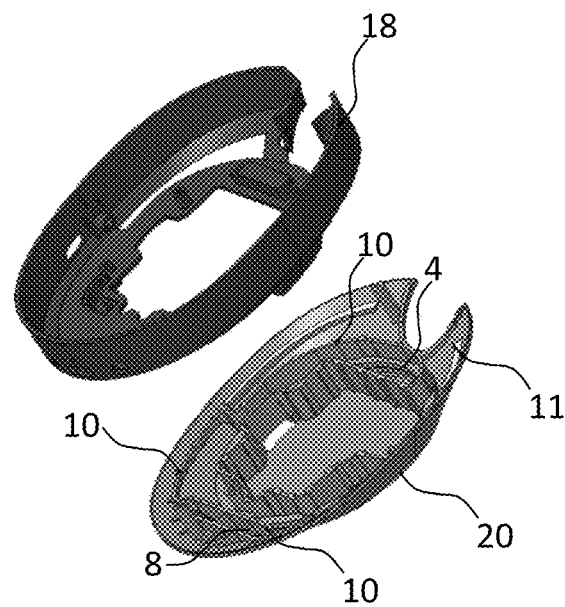
FIGS. 3(a) and (b) illustrate a perspective view of the hearing device shown in FIG. 2.
Figure 3B:
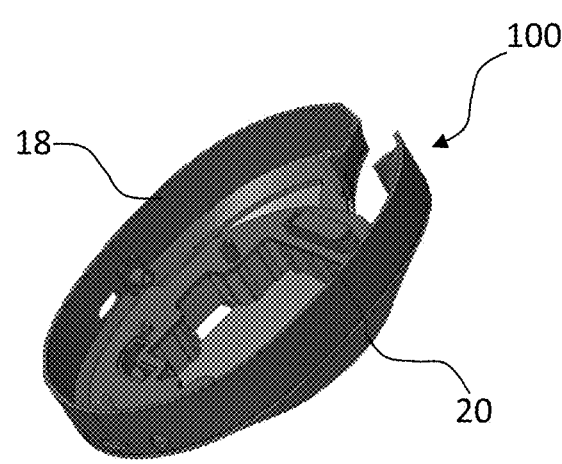

FIGS. 3(a) and (b) illustrate a perspective view of the hearing device shown in FIG. 2. FIG. 3(a) shows the bottom part 18 and the top part 20 before the laser light has been applied. The element 10 is arranged in the top part 20 to seal the sound channel arranged between the first chamber 4 and the second chamber 8. In this embodiment, the element 10 is arranged on the top of a relatively long curved rib in order to seal the sound path which occurs between the microphone chamber 8 and the speaker chamber 4. The welding area 11 is also arranged in the top part 20. Once the laser light is applied the element 10 is melted and the seal between the bottom part 18 and the top part 20 is formed. This is shown in FIG. 3(b). The first chamber 4 and the second chamber 8 may be separated by a printed circuit board (not shown). The top part 20 and the bottom part 18 together form part of the speaker housing. The embodiment shown in FIG. 3(b) may represent an actual design of the hearing device 100. It can be seen that the element10 can be precisely applied/defined as it is in the solid state. It is beneficial as an overflow of the thermoplastic material when it is transformed into liquid cannot occur as the amount of the thermoplastic material is precisely determined prior to application of the laser light. Furthermore, a shape of the element10 can be defined based on an area to be sealed and shaping can be performed anywhere and not while the thermoplastic material is in contact with the top part 20.

Figure 4:
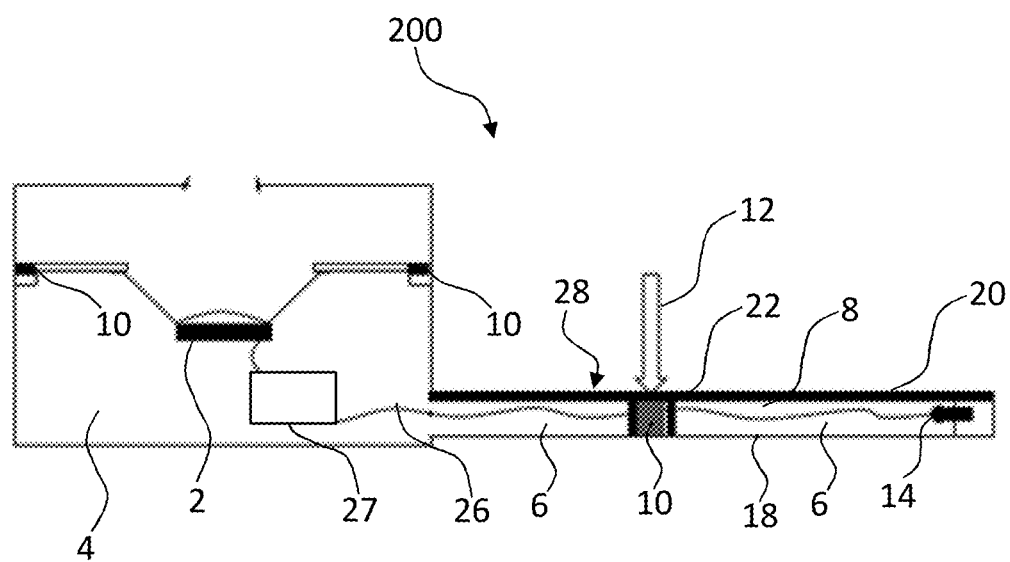
FIG. 4 schematically illustrates a second embodiment of a hearing device.
Figure 6A:
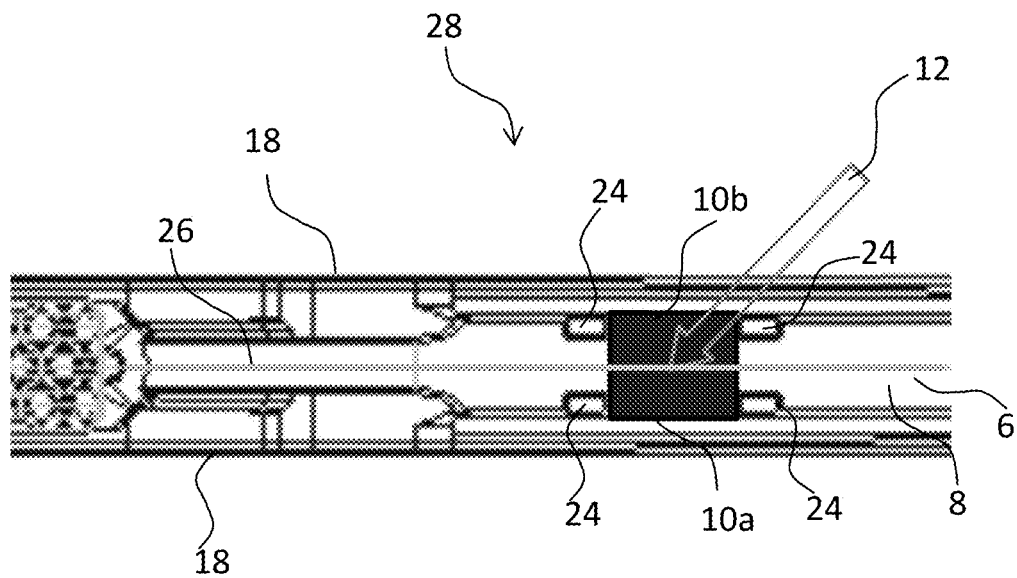
FIGS. 6(a-d) schematically illustrate formation of a seal in a sound channel.
Figure 6B:
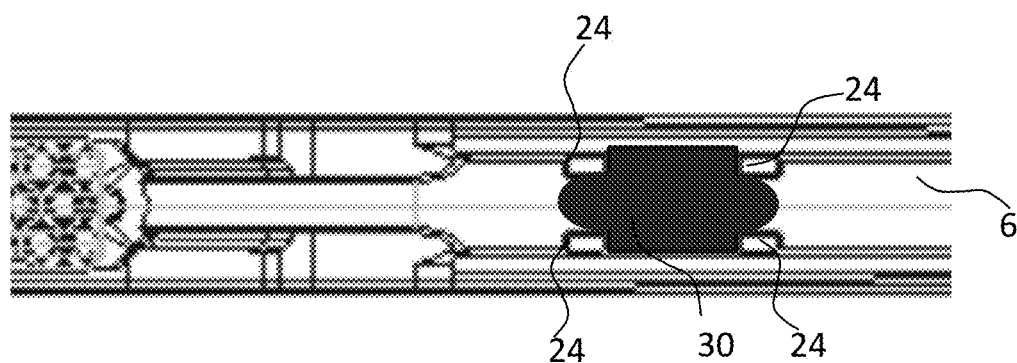
Figure 6C:
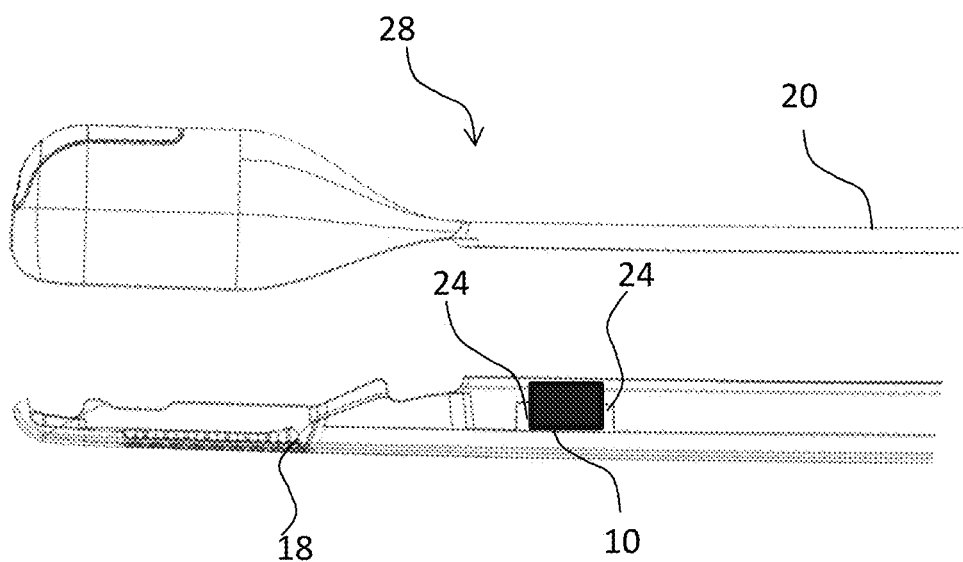
Figure 6D:
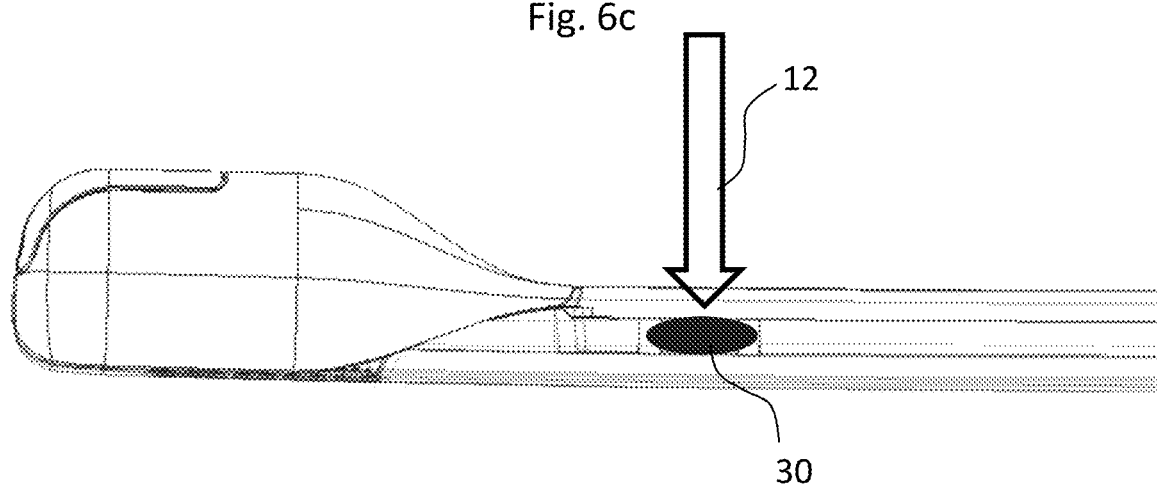

FIG. 4 schematically illustrates a second embodiment of a hearing device 200. A number of features explained in relation to FIG. 1 are equally applicable to this embodiment and therefore will not be described in details, we hereby refer to FIG. 1. In this embodiment, the hearing device 200 further comprises a microphone 14 which is configured to convert sound signal into an electrical signal. The microphone 14 is arranged in a second chamber 8 while the speaker 2 is arranged in the first chamber 4. The microphone 14 and the speaker 2 are interconnected by a wire 26. The wire 26 may comprise of multiple wires. The wire 26 may be connected to various electronics 27 and/or a battery arranged between the speaker 2 and the microphone 14. When the hearing device 200 comprises both the microphone 14 and the speaker 2, the sound channel 6 is arranged between these two. The sound channel 6 allows any sound signal to travel there through. However, this may not be desirable especially if the microphone 14 picks up a signal generated by the speaker 2 and amplifies it. This effect can cause oscillations and instability which lead to a howling sound produced by the hearing device. An acoustic feedback path formed between the microphone 14 and the speaker 2 may need to be closed in order to prevent undesired howling sound and various instabilities which may appear during operation of the hearing device 200. The acoustic path can be closed by sealing at least a part of the sound channel 6 and thereby preventing the signal from the speaker 2 to travel back to the microphone 14. In order to seal the sound channel 6, an element 10 made of thermoplastic is arranged in the sound channel 6. In principle, the element 10 may be positioned anywhere in the sound channel 6, however in a preferred embodiment, the element 10 is positioned either close to the microphone 14 or closer to the speaker 2. By placing the element 10 at one end of a boom arm 28 mechanical properties of the hearing device 200 are improved. The element 10 is arranged in a compartment 22 which may define a way of element reshaping once a laser light 12 is applied onto the element 10. Besides the compartment 22 defining how the element 10 will melt and/or mould, melting of the element is controlled by controlling the laser light 12, i.e. its wavelength, duration of the application, strength, power, etc.

FIGS. 5(*a-c*) illustrate a detailed view, which may be an actual design of the hearing device 200 shown in FIG. 4. The hearing device 200 shown in FIG. 5(*a*) may represent an actual device of a headset comprising the speaker 2 and microphone 14 interconnected with the boom arm 28. FIG. 5(*b*) illustrates a bottom portion of the boom arm 28 in which the microphone 14 is visible as well as the wire 26 interconnecting the microphone 14 and the speaker. The element, comprising two portions 10*a* and 10*b*, is arranged around the wire 26 in the compartment 22 defined by the protrusions 24. When the laser light 12 is applied to the elements 10*a* and 10*b*, the elements will melt together and around the wire 26 thereby sealing the cross-section of the sound channel arranged between the microphone 14 and the speaker. FIG. 5(*c*) illustrates the top part 20 and the bottom part 18 forming a housing for the microphone 14 and further forming the boom arm. Depending on where the laser light is to be applied, the top and bottom part may be made of materials which are transparent to the laser light. Before the laser light is applied to the, e.g., top part, the headset 200 may be completely assembled and sealing of the sound channel may be the last step in manufacturing of the headset 200. Namely, the laser light may be applied to the top part which is transparent to the laser. It is beneficial to create the sealing in the sound channel after the headset 200 has been assembled as in that way it is ensured that the entire cross-section of the sound channel is sealed.

FIGS. 6(*a-d*) schematically illustrate formation of a seal in a sound channel. FIG. 6(*a*) illustrates a top view of a portion of the boom arm 28 of the headset 200 shown in FIG. 5 and arrangement of the element, comprising two portions 10*a* and 10*b* arranged next to each other and around the wire 26 before the laser light 12 has been applied. It should be noted that two portions of the element, 10*a* and 10*b* may alternatively be arranged on top of each other having the wire 26 sandwiched there between. The protrusions 24 are formed in the bottom part 18 thereby forming the compartment in which the elements 10*a* and 10*b* are arranged. After arranging the element portions 10*a* and 10*b* and the wire 26, the top part (not shown) is arranged and then the laser light 12 is applied onto the element, through the top part. Alternatively, the laser light 12 can be applied through the bottom part 18 or through both the top part and the bottom part 18. When the elements 10*a* and 10*b* change their state upon the laser light application, the wire 26 may remain fixed around the center of seal formed from the element. The wire 26 remains unaffected by the laser light 12. By having the element comprising the two or more portions a more reliable sealing is obtained as a better flow of the melted element 10 around the wire 26 is provided. Regardless of the element comprising two or more portions, only one step of laser application may be required. When the element is melted, it may flow around the wire 26 closing even the smallest air gaps existing in the vicinity of the wire 26.

In order to avoid interaction between the laser light 12 and the wire 26, the wire 26 may comprise an insulation material transparent to the laser light 12. The wire 26 typically has a plastic coating. When the coating is transparent to the laser light 12 it would not melt when the laser light 12 is applied to the elements 10*a* and 10*b*. The coating may be coloured in a number of different colours. The selected colour of the coating may depend on the wavelength of the laser light. For wavelengths typically used for laser welding suitable colours may be white for ground and red for phase. Use of other colours is also possible, such as use of yellow, blue, orange, green, and similar. Typically, if the coating is black it will interact with the laser light 12 and melt what is not desirable. Additionally, the wire 26 may be secured in a tube transparent to the laser light 12.

FIG. 6(*b*) illustrates the seal 30 formed after application of the laser light. It can be seen that the element is melted in such a way that it flows into space defined by the protrusions 24 and over the wire filling out the cross-section of the sound channel 6.

FIG. 6(*c*) illustrates a side view of a portion of the boom arm 28 of the headset 200 shown in FIG. 5 and arrangement of the element 10 before the laser light has been applied. It can be noticed that the size of the compartment is slightly smaller than the size of the element. Larger size of the element 10 compared to the compartment provides for excess amount of the element to leak out of the compartment thereby providing a tight seal without any air gaps.

FIG. 6(*d*) illustrates a side view of the seal 30 formed after application of the laser light 12.

Although particular features have been shown and described, it will be understood that they are not intended to limit the claimed invention, and it will be made obvious to those skilled in the art that various changes and modifications may be made without departing from the scope of the claimed invention. The specification and drawings are, accordingly to be regarded in an illustrative rather than restrictive sense. The claimed invention is intended to cover all alternatives, modifications and equivalents.

LIST OF REFERENCES

2 speaker
4 first chamber
6 sound channel
8 second chamber
10 element
11 welding area
12 laser light
13 welding laser beam
14 microphone
16 speaker housing
18 bottom part
20 top part
22 compartment
24 protrusion
26 wire
27 electronics
28 boom arm
30 seal

The invention claimed is:

1. A method for manufacturing a hearing device, the hearing device comprising—a speaker, a microphone, one or more wires interconnecting the speaker and the microphone, a first chamber, and a sound channel arranged between the first chamber and a second chamber, wherein the speaker is arranged in the first chamber and the microphone is arranged in the second chamber the method comprising: arranging an element of a thermoplastic material in the sound channel, the element being in a solid state; arranging the one or more wires in the sound channel and through the element: forming at least a top part of said sound channel of a light transmissible material capable of passing laser light therethrough; applying a laser light through said top part to the element to thereby activate the element to change from the solid state to a liquid state; sealing the sound channel by means of the element changing from the solid state to the liquid state thereby filling out a cross-section of the sound channel; allowing cooling of the element thereby a change of the element from the liquid state to solid state while filling out the cross-section of the sound channel, wherein the one or more wires comprise an insulation material transparent to the laser light.

2. The method according to claim 1, wherein the hearing device further comprises a speaker housing, the first chamber and the second chamber being arranged in the speaker housing.

3. The method according to claim 1, wherein the element is provided closer to the second chamber than to the first chamber.

4. The method according to claim 1, wherein the element is provided closer to the first chamber than to the second chamber.

5. The method according to claim 1, wherein the element comprises two portions and wherein the one or more wires are arranged between the two portions.

6. The method according to claim 1, wherein the laser light is a continuous wave laser light, and wherein the wavelength of the laser light is about 985 nm.

7. The method according to claim 1, wherein the laser light is applied by guiding the light towards the element by means of at least one mirror arranged on a fixture, the mirror reflecting the laser light.

8. The method according to claim 1, wherein the thermoplastic material is a thermoplastic adhesive.

9. The A method according to claim 8, wherein the thermoplastic adhesive is a hot melt adhesive, such as a hot melt glue.

10. The method according to claim 1, wherein the hearing device comprises a bottom part and a top part and wherein the element is provided in a compartment defined by at least a portion of the bottom part and by at least a portion of the top part, and wherein the compartment is further defined by at least one protrusion extending into the interior of the sound channel of hearing device.

11. The method according to claim 10, wherein the top part is made of a material transparent to the laser light and wherein the bottom part is made of a material non-transparent to the laser light.

12. The method according claim 10, wherein the top part and the bottom part are made of a material transparent to the laser light.

13. The method according to claim 10, wherein the thermoplastic material has a melting point which is lower than a melting point of the top part and a melting point of the bottom part, the melting point of the thermoplastic material being in the range between 85° C. and 100° C.

* * * * *